US008775024B2

(12) United States Patent
Hara et al.

(10) Patent No.: US 8,775,024 B2
(45) Date of Patent: Jul. 8, 2014

(54) STEERING DAMPER SYSTEM, AND A SADDLE RIDING TYPE VEHICLE HAVING THE SAME

(75) Inventors: Nobuo Hara, Shizuoka (JP); Yasuhiro Oomura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1334 days.

(21) Appl. No.: 12/471,565

(22) Filed: May 26, 2009

(65) Prior Publication Data
US 2009/0302557 A1 Dec. 10, 2009

(30) Foreign Application Priority Data
Jun. 4, 2008 (JP) ................................ 2008-146921

(51) Int. Cl.
*B62D 6/00* (2006.01)
*B60G 17/016* (2006.01)
(52) U.S. Cl.
USPC .................. 701/41; 701/37; 701/38; 701/39; 701/40; 701/42; 701/43; 701/44; 280/5.512; 280/272
(58) Field of Classification Search
USPC ................ 701/37–44, 82, 90; 280/5.512, 272
See application file for complete search history.

(56) References Cited

U.S. PATENT DOCUMENTS

| 4,811,807 | A | 3/1989 | Schier |
| 6,637,558 | B2 * | 10/2003 | Oliver et al. ............... 188/267.2 |
| 6,742,794 | B2 * | 6/2004 | Bunya et al. .................. 280/272 |
| 7,044,489 | B2 * | 5/2006 | Bunya et al. .................. 280/272 |
| 7,306,248 | B2 * | 12/2007 | Gogo et al. .................... 280/272 |
| 7,958,979 | B2 * | 6/2011 | Sekiya et al. .............. 188/267.2 |
| 7,970,511 | B2 * | 6/2011 | Kohls ................................ 701/36 |
| 2005/0173911 | A1 * | 8/2005 | Takeuchi et al. .............. 280/771 |
| 2006/0207845 | A1 | 9/2006 | Goto et al. |
| 2007/0216124 | A1 * | 9/2007 | Wakabayashi et al. ......... 280/89 |
| 2009/0071773 | A1 * | 3/2009 | Lun ............................ 188/267.2 |
| 2012/0022746 | A1 * | 1/2012 | Negoro et al. .................. 701/42 |

FOREIGN PATENT DOCUMENTS

| EP | 1 248 013 A2 | 10/2002 | |
| EP | 1 318 069 A2 | 6/2003 | |
| EP | 1318069 A2 * | 6/2003 | ............. B62K 21/08 |

(Continued)

OTHER PUBLICATIONS

Official Communication issued in corresponding European Patent Application No. 09007084.8, mailed on Aug. 4, 2009.

*Primary Examiner* — Jack W Keith
*Assistant Examiner* — Chuong P Nguyen
(74) *Attorney, Agent, or Firm* — Keating & Bennett, LLP

(57) ABSTRACT

A steering damper system for a saddle riding type vehicle having an MR damper includes a damping force calculating unit arranged to calculate a damping force according to a steering angle speed, and an adjusting command output unit arranged to determine a running state from a vehicle speed and a steering angle detected by sensors, with reference to a reference table, and correcting the damping force calculated according to the running state. The reference table has areas divided by a steering angle range according to vehicle speed, and damping force adjustment factors according to running states are assigned to these areas. The steering angle range dividing the areas becomes narrower with an increase in vehicle speed, to accurately reflect the running states of the vehicle. A proper damping force can be generated according to a running state of the vehicle. The steering damper system eases the rider's burden accompanying steering operations, and is excellent in controllability.

18 Claims, 9 Drawing Sheets

(56) References Cited

FOREIGN PATENT DOCUMENTS

| | | |
|---|---|---|
| EP | 1 459 971 A2 | 9/2004 |
| EP | 1 481 882 A2 | 12/2004 |
| EP | 1 561 677 A1 | 8/2005 |
| JP | 63-064888 A | 3/1988 |
| JP | 2003-170883 A | 6/2003 |
| JP | 2007316299 A * 12/2007 | ............... B62D 6/00 |
| KR | 2005118405 A * 12/2005 | ............... F16F 9/50 |

* cited by examiner

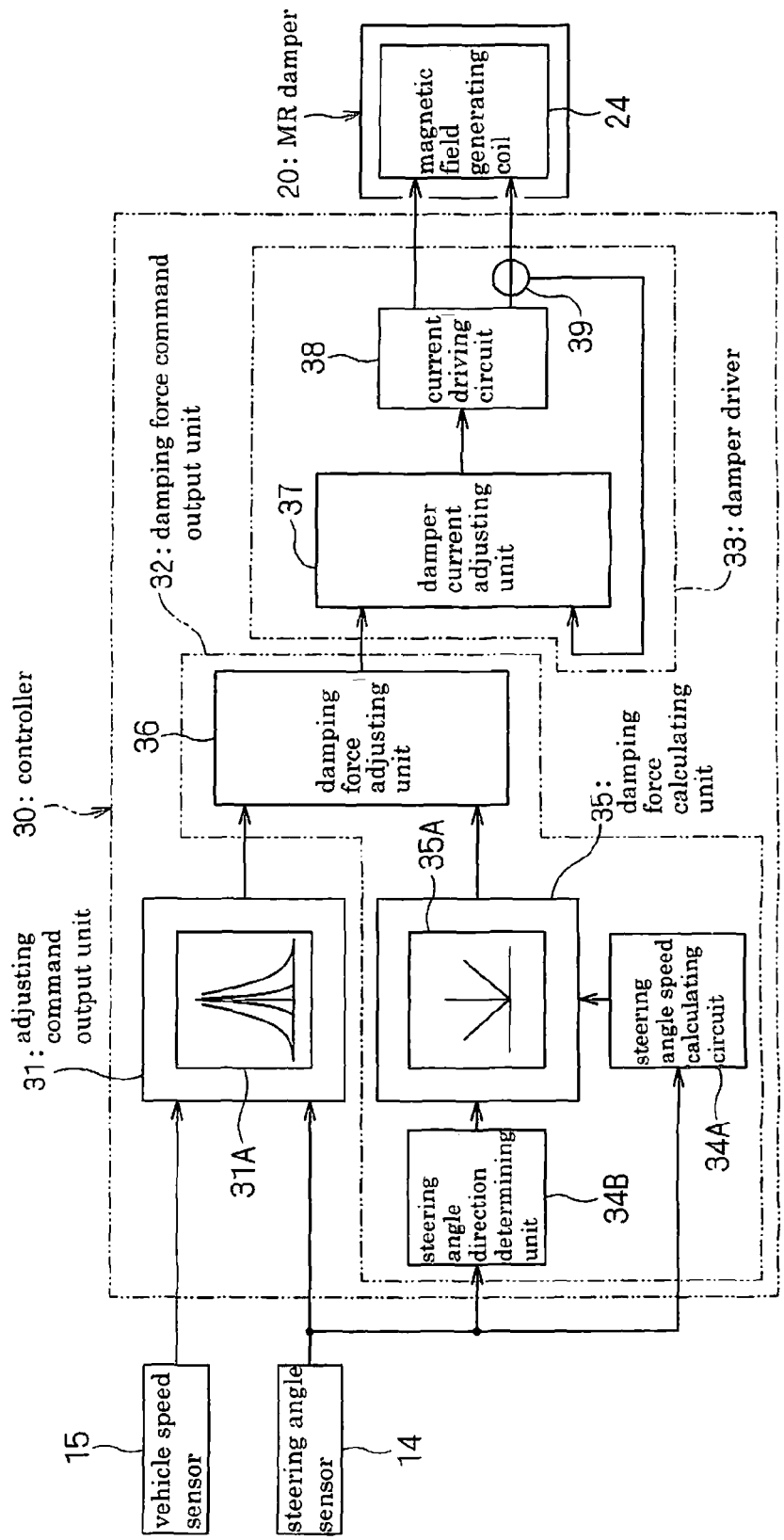

STEERING DAMPER SYSTEM, AND A SADDLE RIDING TYPE VEHICLE HAVING THE SAME

BACKGROUND OF THE INVENTION

1. Field of the Invention

The present invention relates to a steering damper system for use on a vehicle, and to a saddle riding type vehicle equipped with the steering damper system.

2. Description of the Related Art

Conventionally, a hydraulic damper is well known as a steering damper mounted on a saddle riding type vehicle. The hydraulic damper uses a damping force generated when hydraulic oil in an oil chamber passes through an orifice, and can obtain a damping force according to a steering angle speed. Recently, steering damper systems of the electronically controlled type have been disclosed. See Japanese Unexamined Patent Publication No. 2003-170883 (pages 3-6, FIGS. 1 and 2) and Japanese Unexamined Patent Publication S63-64888 (pages 3-4, drawings), for example.

When a steering angle speed of the handlebars in Japanese Unexamined Patent Publication No. 2003-170883 is equal to or less than a first threshold, a relatively small damping force is generated and this damping force is adjusted according to a vehicle speed. When a steering angle speed exceeds the first threshold and is equal to or less than a second threshold, a medium damping force is generated and this damping force is adjusted according to the steering angle speed. When a steering angle speed exceeds the second threshold, a large damping force is generated and this damping force is adjusted according to the steering angle speed.

When a vehicle speed and a steering angle in Japanese Unexamined Patent Publication S63-64888 exceed predetermined threshold limit values, a control device will control a buffer to increase a damping force.

Both techniques described in Japanese Unexamined Patent Publication No. 2003-170883 and Japanese Unexamined Patent Publication S63-64888 adjust damping forces according to vehicle speeds. However, it can hardly be said that these techniques are fully satisfactory with regard to both the rider's burden and controllability in steering operations. When a relatively large steering control is required during a high-speed run, such as when the vehicle negotiates a corner at high speed, for example, a large damping force generated according to the vehicle speed will deprive the rider of a natural feeling of operation. Conversely, a lowering of the function to adjust the damping force according to the vehicle speed will increase the rider's burden for stabilizing a steering operation during a high-speed run. Further, when the vehicle jumps as does an off-road vehicle, the rider turns the handlebars to a large degree in the air to control the vehicle. At such times, a large damping force will result in a heavy steering operation, thereby worsening the feeling of the steering operation.

SUMMARY OF THE INVENTION

In order to overcome the problems described above, preferred embodiments of the present invention provide a steering damper system, and a saddle riding type vehicle equipped with the steering damper system, capable of adjusting a steering damping force to a level suited for running states of the vehicle, thereby reducing the rider's burden and securing excellent controllability during steering operations.

The present inventors have directed their attention to steering angle ranges according to vehicle speeds in order to adjust a steering damping force to a level suited for a running state of the vehicle. That is, running states of the vehicle involving steering operations can be divided into a straight running state, a cornering state, and a special running state such as jumping. The steering angle ranges in steering operations conceivable in the varied running states increase in the order of the straight running state, cornering state, and special running state such as jumping. The steering angle ranges also tend to become smaller with an increase in vehicle speed.

Thus, a vehicle speed and a steering angle of the vehicle during a run may be detected, and a determination may be made whether the detected steering angle falls within a steering angle range determined in advance according to the vehicle speed. This procedure will indicate a running state of the vehicle at that time. What is necessary is just to generate a damping force according to this running state. Specifically, in a straight running state, the rider maintains the balance of the vehicle while carrying out steering operations at small steering angles. In this case, the damping force is reduced in order not to obstruct natural steering action. On the other hand, the damping force is increased for a cornering state to reduce the rider's burden for stabilizing a steering operation. The damping force is made small in special running states, such as jumping, counter steering to cause the rear wheel to skid, and a wheelie run, in order to allow the rider to carry out steering operations freely. Thus, a steering damper system can be realized which adjusts the damping force according to the running states as above, thereby lightening the rider's burden accompanying steering operations, and securing excellent controllability.

Based on the above findings, preferred embodiments of the present invention provide the following constructions.

According to a first aspect of a first preferred embodiment of the present invention, a steering damper system for use on a vehicle includes a damper arranged to generate a steering damping force; a storage unit arranged to store control information in which areas for determining the amount of the adjustment of the damping force are divided by a steering angle range according to vehicle speed, wherein the steering angle range becomes narrower with an increase in the vehicle speed; an adjusting command output unit arranged to output a damping force adjusting command based on the control information stored in the storage unit according to one of the areas to which a vehicle speed and a steering angle belong; a damping force command output unit arranged to output a damping force command to the damper according to the damping force adjusting command; and a damper driver arranged to drive the damper and to adjust the damping force based on the damping force command.

According to the first preferred embodiment of the present invention, the adjusting command output unit preferably refers to the control information stored in the storage unit, and outputs a damping force adjusting command according to one of the areas in the control information to which a vehicle speed and a steering angle belong. The areas of the control information correspond to running states of the vehicle determined by the vehicle speed and steering angle. The areas are divided by the steering angle range according to the vehicle speed, and the steering angle range becomes narrower with an increase in vehicle speed. The control information with the areas accurately reflect the running states of the vehicle. Thus, by referring to this control information, a running state of the vehicle can be determined accurately from the vehicle speed and steering angle, and the damping force according to the running state of the vehicle can be adjusted properly. The damping force adjusting command outputted from the adjusting command output unit is provided to the damping force command output unit. The damping force command output unit outputs a damping force command to the damper according to the damping force adjusting command. The damper driver drives the damper and adjusts the damping force based on the damping force command. Consequently, the steering damping force becomes a level suitable for the running state of the vehicle. The steering damper system can reduce the rider's burden in steering operations, and is excellent in controllability.

According to the first preferred embodiment of the present invention, it is preferred that the control information stored in the storage unit includes a first steering angle range corresponding to a steering angle range applicable when the vehicle is in a cornering state; and the adjusting command output unit is arranged to output an adjusting command to generate a first damping force when the vehicle speed and the steering angle belong to an area inside the first steering angle range, and to output an adjusting command to generate a second damping force smaller than the first damping force when the vehicle speed and the steering angle belong to an area outside the first steering angle range.

With this construction, when the vehicle speed and steering angle belong to the area inside the first steering angle range, the vehicle is determined to be in a cornering state, and an adjusting command is outputted to generate the first damping force. As a result, in a cornering state, the first damping force specified appropriately acts on the handlebars thereby reducing the burden of the rider for stabilizing the steering action. Moreover, the first steering angle range becomes narrower with an increase in vehicle speed. This accurately reflects an ordinary cornering state where the steering angle range at the time of cornering becomes narrower with an increase in vehicle speed. Thus, that the vehicle is in a cornering state can be determined properly. On the other hand, when the vehicle speed and steering angle belong to the area outside the first steering angle range, the vehicle is determined to be in a special running state where the rider turns the handlebars to large degrees intentionally in order to control the vehicle. Then, an adjusting command is outputted to generate a second damping force smaller than the first damping force. Since the steering damping force becomes small as a result, controllability is improved to allow the rider to carry out steering operations freely.

According to the first preferred embodiment of the present invention, it is preferred that the control information stored in the storage unit includes a second steering angle range corresponding to a steering angle range applicable when the vehicle is in a straight running state; and the adjusting command output unit is arranged to output an adjusting command to generate a first damping force when the vehicle speed and the steering angle belong to an area outside the second steering angle range, and to output an adjusting command to generate a third damping force smaller than the first damping force when the vehicle speed and the steering angle belong to an area inside the second steering angle range.

With this construction, when the vehicle speed and steering angle belong to the area outside the second steering angle range, the vehicle is determined to be in a cornering state, and an adjusting command is outputted to generate the first damping force. As a result, in a cornering state, the first damping force specified appropriately acts on the handlebars thereby reducing the burden of the rider for stabilizing the steering action. On the other hand, when the vehicle speed and steering angle belong to the area inside the second steering angle range, the vehicle is determined to be in a straight running state, and an adjusting command is outputted to generate a third damping force smaller than the first damping force. Since the steering damping force becomes small as a result, the rider can easily maintain the balance of the vehicle with the use of small steering angles. Moreover, the second steering angle range becomes narrower with an increase in vehicle speed. This accurately reflects an ordinary straight running state where the steering angle range at the time of straight running becomes narrower with an increase in vehicle speed. Thus, it is possible to accurately determine that the vehicle is in a straight running state.

According to the first preferred embodiment of the present invention, it is preferred that the control information stored in the storage unit includes a first steering angle range corresponding to a steering angle range applicable when the vehicle is in a cornering state, and a second steering angle range inward of the first steering angle range and corresponding to a steering angle range applicable when the vehicle is in a straight running state; and the adjusting command output unit is arranged to output an adjusting command to generate a first damping force when the detected vehicle speed and the steering angle belong to an area outside the second steering angle range and inside the first steering angle range, to output an adjusting command to generate a second damping force smaller than the first damping force when the vehicle speed and the steering angle belong to an area outside the first steering angle range, and to output an adjusting command to generate a third damping force smaller than the first damping force when the vehicle speed and the steering angle belong to an area inside the second steering angle range.

With this construction, when the vehicle speed and steering angle belong to the area outside the second steering angle range and inside the first steering angle range, the vehicle is determined to be in a cornering state, and the first damping force specified appropriately is generated. This reduces the rider's burden accompanying the steering operation at the time of cornering. When the vehicle speed and steering angle belong to the area outside the first steering angle range, the second damping force smaller than the first damping force is generated. This allows the rider to carry out steering operations freely, and improves controllability. Further, when the vehicle speed and steering angle belong to the area inside the second steering angle range, the vehicle is determined to be in a straight running state, and the third damping force smaller than the first damping force is generated thereby facilitating the maintenance of balance in a straight running state. The first and second steering angle ranges both become narrower with an increase in vehicle speed. Thus, a running state of the vehicle can be determined properly, thereby reducing the rider's burden accompanying steering operations, and improving controllability.

According to the first preferred embodiment of the present invention, it is preferred that the control information stored in the storage unit includes an amount of adjustment of the damping force that is gradually variable with a distance from a boundary line dividing the areas.

With this construction, the amount of adjustment of the damping force vary gradually with the distance from the boundary line dividing the areas. Thus, when the running state of the vehicle changes, such as when a change is made from a straight running state to a cornering state, for example, the damping force gradually changes following the change in the running state. Consequently, the rider does not experience an odd feeling caused by a sudden change of the damping force.

According to the first preferred embodiment of the present invention, it is preferred that the damping force command output unit includes a steering angle speed calculating unit arranged to calculate a steering angle speed; a damping force calculating unit arranged to output an initial command of the damping force according to the steering angle speed, such that the damping force becomes larger with an increase in the steering angle speed; and a damping force adjusting unit operable in response to the damping force adjusting command from the adjusting command output unit, to adjust the initial command of the damping force and to output the damping force command to the damper.

With this construction, an initial command of the damping force according to a steering angle speed is first calculated such that the damping force becomes larger with an increase in the steering angle speed. This initial command of the damping force is adjusted according to the damping force adjusting command. Thus, the steering damper system is provided in which the damping force variable with the steering angle speed reduces the rider's burden accompanying steering operations, and which is excellent in controllability.

According to the first preferred embodiment of the present invention, it is preferred that the damping force calculating unit is arranged, when steering action is taken in a direction to increase the steering angle, to output the initial command of the damping force according to the steering angle speed such that the damping force becomes larger with an increase in the steering angle speed, and when steering action is taken in a direction to decrease the steering angle, to output a command to substantially minimize the damping force.

With this construction, when steering action is taken in a direction to increase the steering angle, such as when a transition is made from a straight running state to a cornering state, for example, the initial command of the damping force according to the steering angle speed is outputted. This reduces the rider's burden accompanying the steering operation at a cornering time. When steering action is taken in a direction to decrease the steering angle, such as when exiting from cornering, i.e., when a transition is made from a cornering state to a straight running state, a command is outputted to substantially minimize the damping force. As a result, the damping force is substantially minimized at a time of exiting from cornering. This allows the rider to control the vehicle easily, and improves controllability at a time of exiting from cornering.

According to the first preferred embodiment of the present invention, it is preferred that the damping force calculating unit is arranged to adjust the damping force according to the steering angle speed such that the damping force becomes larger with an increase in the vehicle speed.

This construction outputs the initial command of the damping force after adjusting the damping force according to the steering angle speed to become larger with an increase in vehicle speed. Thus, the damping force becomes large as the vehicle speed becomes fast. As a result, the rider's burden accompanying the steering operation is minimized when the vehicle runs at high speed.

According to the first preferred embodiment of the present invention, it is preferred that the damper includes a first member and a second member opposed to each other, a magnetic fluid interposed between the two members, and a magnetic field generating coil arranged to apply a magnetic field to the magnetic fluid, one of the first member and the second member being connected to a vehicle body, the other being connected to handlebars; and the damper driver includes a current control unit arranged to adjust a current value applied to the magnetic field generating coil of the damper based on the damping force command.

With this construction, the current value applied to the magnetic field generating coil of the damper is adjusted based on the damping force command, and therefore a magnetic field of an intensity corresponding to the damping force command acts on the magnetic fluid interposed between the first member and second member of the damper.

As a result, the viscosity of the magnetic fluid varies according to the damping force command, and the damping force corresponding to the damping force command acts on the handlebars. The viscosity of the magnetic fluid quickly varies following variations in the current value provided to the magnetic field generating coil (variations in the magnetic field intensity), to realize a steering damper system having a quick response.

The present inventors have directed their attention also to steering angle speed ranges according to vehicle speeds in order to adjust a steering damping force to a level suited for a running state of the vehicle. That is, when the vehicle is driven to maintain its balance while carrying out steering operations with relatively slow steering speeds as in a straight running state, the damping force is reduced in order not to obstruct natural handlebar control. On the other hand, when the vehicle is driven while carrying out steering operations with relatively fast steering speeds as in a cornering state, the damping force is increased to reduce the rider's burden for stabilizing a steering operation. Thus, a steering damper system can be achieved which adjusts the damping force according to the running state as above, thereby reducing the rider's burden accompanying steering operations, and securing excellent controllability.

Based on the above findings, a second preferred embodiment of the present invention provides the following constructions.

According to a second preferred embodiment of the present invention, a steering damper system for use on a vehicle includes a damper arranged to generate a steering damping force; a steering angle speed calculating unit arranged to calculate a steering angle speed; a storage unit arranged to store control information in which areas for determining an amount of adjustment of the damping force are divided by a steering angle speed range according to vehicle speed, wherein the steering angle speed range becomes narrower with an increase in the vehicle speed; an adjusting command output unit arranged to output a damping force adjusting command based on the control information stored in the storage unit according to one of the areas to which a vehicle speed and the steering angle speed calculated belong; a damping force command output unit arranged to output a damping force command to the damper according to the damping force adjusting command; and a damper driver arranged to drive the damper and to adjust the damping force based on the damping force command.

According to the second preferred embodiment of the present invention, a steering angle speed is calculated, and the steering angle speed and the vehicle speed are provided to the adjusting command output unit. The adjusting command output unit refers to the control information stored in the storage unit, and outputs a damping force adjusting command according to the area of the control information to which the vehicle speed and steering angle speed belong. The areas marked off on the control information correspond to running states of the vehicle determined by the vehicle speed and the steering angle speed. These areas are marked off by the steering angle speed range corresponding to the vehicle speed, and become narrower with an increase in vehicle speed. The control information accurately reflects the running states of the vehicle. Therefore, by referring to the control information stored in the storage unit, running states of the vehicle can be determined accurately from the detected vehicle speed and steering angle speed. Therefore, the damping force according to the running states of the vehicle can be adjusted properly. The damping force adjusting command outputted from the adjusting command output unit is provided to the damping force command output unit. The damping force command output unit outputs a damping force command to the damper according to the damping force adjusting command. The damper driver drives the damper and adjusts the damping force based on the damping force command. Consequently, the damping force for steering becomes suitable for running states of the vehicle. The steering damper system can reduce the rider's burden accompanying steering operations, and realizes excellent controllability.

According to the second preferred embodiment of the present invention, it is preferred that the control information stored in the storage unit includes a steering angle speed range applicable when the vehicle is in a straight running state; and the adjusting command output unit is arranged to output an adjusting command to generate a first damping force when the vehicle speed and the steering angle speed calculated belong to an area outside the steering angle speed range, and to output an adjusting command to generate a second damping force smaller than the first damping force when the calculated vehicle speed and the steering angle speed belong to an area inside the steering angle speed range.

With this construction, when the vehicle speed and steering angle speed belong to the area outside the steering angle speed range, the vehicle is determined to be in a cornering state, and an adjusting command is outputted to generate a first damping force. As a result, in a cornering state, the first damping force specified appropriately acts on the handlebars thereby reducing the burden of the rider accompanying the steering operations. On the other hand, when the vehicle speed and steering angle speed belong to the area inside the steering angle speed range, the vehicle is determined to be in a straight running state, and an adjusting command is outputted to generate a second damping force smaller than the first damping force. Since, in a straight running state, the steering damping force becomes small as a result, the rider can easily maintain the balance of the vehicle with the use of small steering angles thereby improving controllability at the time of straight running. Moreover, the steering angle speed range becomes narrower with an increase in vehicle speed. This accurately reflects an ordinary straight running state where the steering angle speed range at the time of straight running becomes narrower with an increase in vehicle speed. Thus, whether the vehicle is in a straight running state or in a cornering state can be determined properly so as to adjust the damping force appropriately according to a running state.

According to a second aspect of the first preferred embodiment of the present invention, a saddle riding type vehicle having a steering damper system is provided. This vehicle includes a vehicle speed detector arranged to detect a vehicle speed; a steering angle detector arranged to detect a steering angle; a damper arranged to generate a steering damping force; a storage unit arranged to store control information in which areas for determining an amount of adjustment of the damping force are divided by a steering angle range according to vehicle speed, wherein the steering angle range becomes narrower with an increase in the vehicle speed; an adjusting command output unit arranged to output a damping force adjusting command based on the control information stored in the storage unit according to one of the areas to which the vehicle speed detected by the vehicle speed detector and the steering angle detected by the steering angle detector belong; a damping force command output unit arranged to output a damping force command to the damper according to the damping force adjusting command; and a damper driver arranged to drive the damper and to adjust the damping force based on the damping force command.

According to the second aspect of the first preferred embodiment of the present invention, a vehicle speed and a steering angle are detected by the respective detectors, and the steering damping force is appropriately adjusted according to a running state. This provides a saddle riding type vehicle which minimizes the rider's burden accompanying the steering operations, and which is excellent in controllability.

Further, a second aspect of the second preferred embodiment of the present invention provides a saddle riding type vehicle having a steering damper system, the vehicle including a vehicle speed detector arranged to detect a vehicle speed; a steering angle detector arranged to detect a steering angle; a damper arranged to generate a steering damping force; a steering angle speed calculating unit arranged to calculate a steering angle speed based on the steering angle detected by the steering angle detector; a storage unit arranged to store control information in which areas for determining an amount of adjustment of the damping force are divided by a steering angle speed range according to vehicle speed, wherein the steering angle speed range becomes narrower with an increase in the vehicle speed; an adjusting command output unit arranged to output a damping force adjusting command based on the control information stored in the storage unit according to one of the areas to which the vehicle speed detected by the vehicle speed detector and the steering angle speed calculated belong; a damping force command output unit arranged to output a damping force command to the damper according to the damping force adjusting command; and a damper driver arranged to drive the damper and adjust the damping force based on the damping force command.

According to the second aspect of the second preferred embodiment of the present invention, based on a detected vehicle speed and a calculated steering angle speed, the steering damping force is appropriately adjusted according to the running state. This provides a saddle riding type vehicle which minimizes the rider's burden accompanying the steering operations, and which is excellent in controllability.

Other features, elements, steps, characteristics and advantages of the present invention will become more apparent from the following detailed description of preferred embodiments of the present invention with reference to the attached drawings.

BRIEF DESCRIPTION OF THE DRAWINGS

For the purpose of illustrating the present invention, there are shown in the drawings several forms which are presently preferred, it being understood, however, that the present invention is not limited to the precise arrangement and instrumentalities shown.

FIG. 3A is a view in vertical section showing an outline of the MR damper, FIG. 3B is an exploded perspective view, and FIG. 3C is an enlarged fragmentary sectional view.

FIG. 4 is a block diagram showing an outline of a steering damper system according to the first preferred embodiment of the present invention.

DETAILED DESCRIPTION OF THE PREFERRED EMBODIMENTS

Preferred embodiments of the present invention will be described in detail hereinafter with reference to the drawings.

First Preferred Embodiment

A first preferred embodiment of the present invention (i.e., the first and second aspects of the first preferred embodiment of the present invention) will be described hereinafter with reference to the drawings.

Here, a motorcycle will be described as an example of saddle riding type vehicles having a steering damper system in the first preferred embodiment.

(1) Overall Construction

Figure 1:
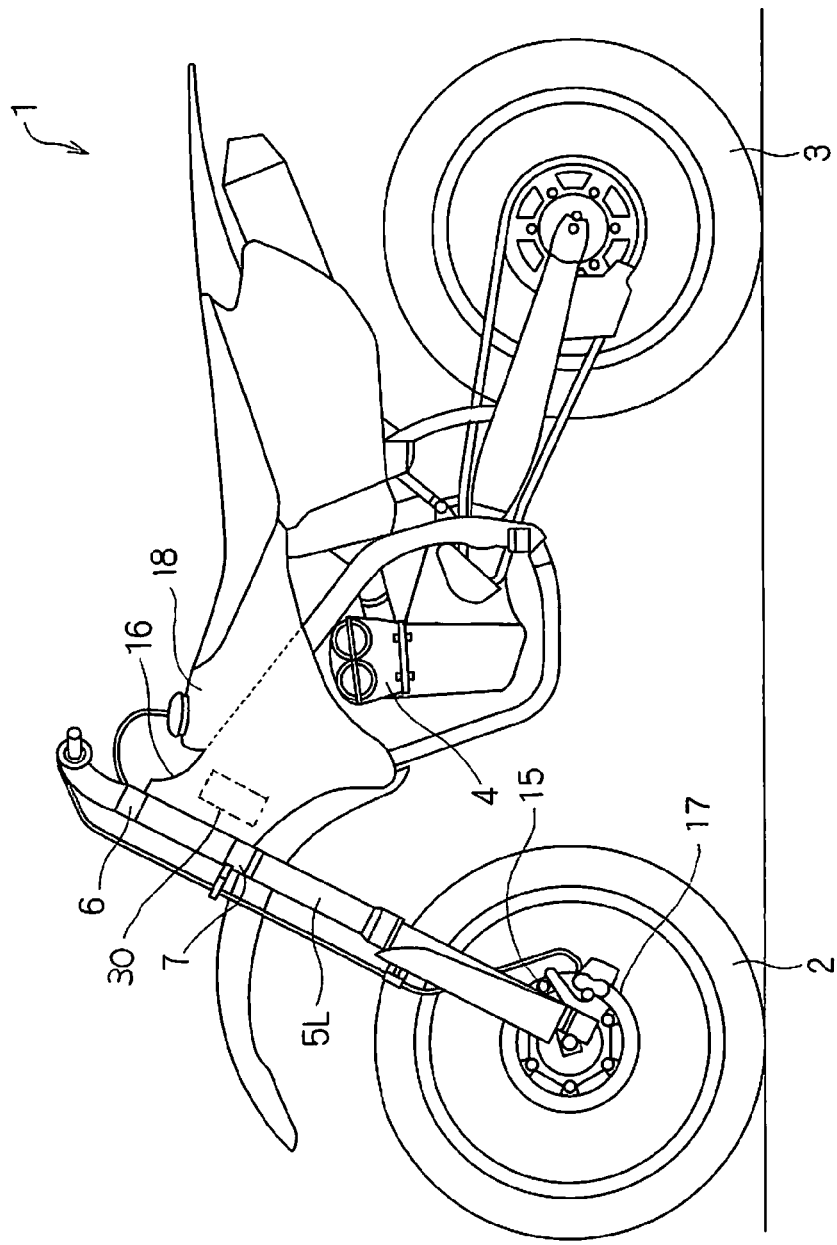
FIG. 1 is a side view showing an outline of a motorcycle according to a first preferred embodiment of the present invention.
Figure 2:
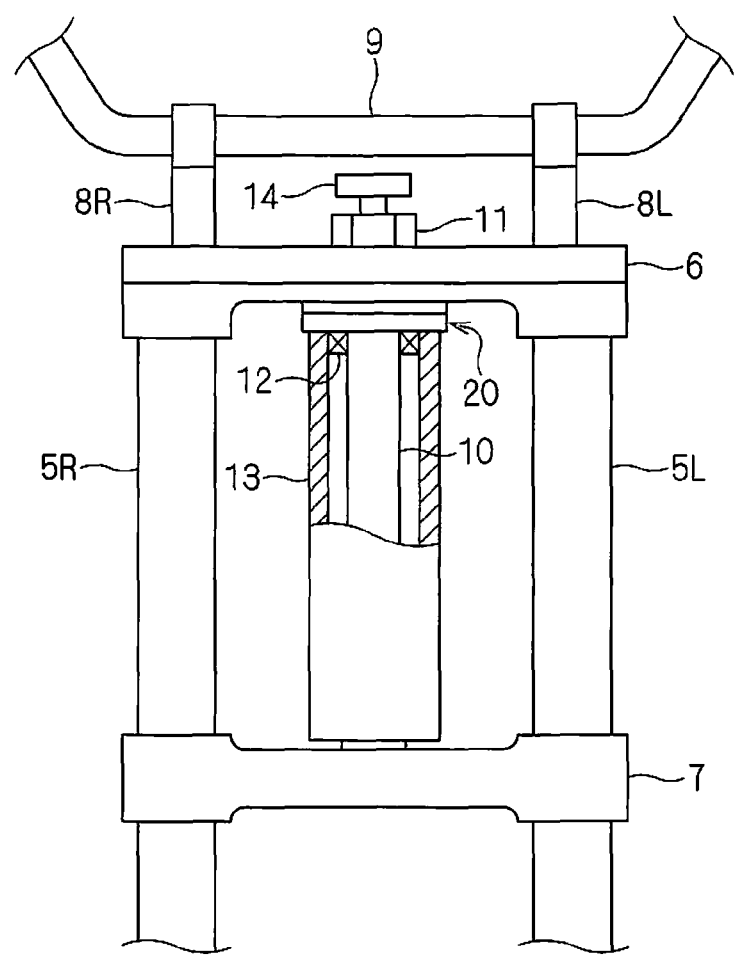
FIG. 2 is a front view partly in section showing a construction around a steering crown.

FIG. 1 is a side view showing an outline of the motorcycle in the first preferred embodiment. FIG. 2 is a front view partly in section showing a construction around a steering crown.

A motorcycle 1 has a front wheel 2 and a rear wheel 3. The rear wheel 3 is driven by the driving force of an engine 4. The front wheel 2 is rotatably supported by a pair of right and left front forks 5R and 5L. The front forks 5R and 5L have upper ends thereof connected to and supported by a steering crown 6, and intermediate portions connected to and supported by an under bracket 7. The steering crown 6 has a pair of right and left handle holders 8R and 8L arranged on the upper surface thereof. These handle holders 8R and 8L hold handlebars 9 controllable by the rider. The steering crown 6 and under bracket 7 are connected by a steering shaft 10. The lower end of the steering shaft 10 is engaged by a steering shaft receiver (not shown) of the under bracket 7 so as not to detach upward. The upper end of the steering shaft 10 is secured to the steering crown 6 with a nut 11. The steering shaft 10 is rotatably supported by a head pipe 13 through bearings 12. The head pipe 13 is connected to a vehicle body frame 16. A vehicle speed sensor 15 is disposed adjacent a disk brake 17 of the front wheel 2. A controller 30 is disposed in front of a fuel tank 18.

When the rider operates the handlebars 9, a steering force is transmitted to the front forks 5R and 5L through the steering shaft 10 to steer the front wheel 2. A steering angle sensor 14 preferably including a rotary potentiometer is attached to the upper end of the steering shaft 10. This steering angle sensor 14 detects steering angles. The steering angle sensor 14 preferably corresponds to the steering angle detector according to a preferred embodiment of the present invention. The steering angle detector is not limited to a potentiometer, but may be various other angle detectors such as an optical rotary encoder.

(2) Construction of MR Damper

Figure 3A:
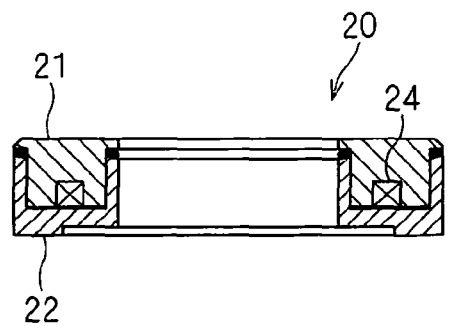
FIGS. 3A through 3C are views showing a construction of an MR damper, and in particular.
Figure 3B:
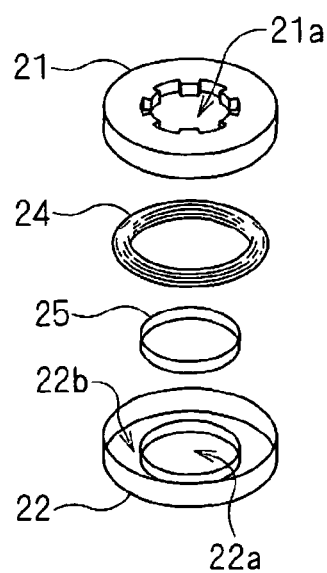
Figure 3C:
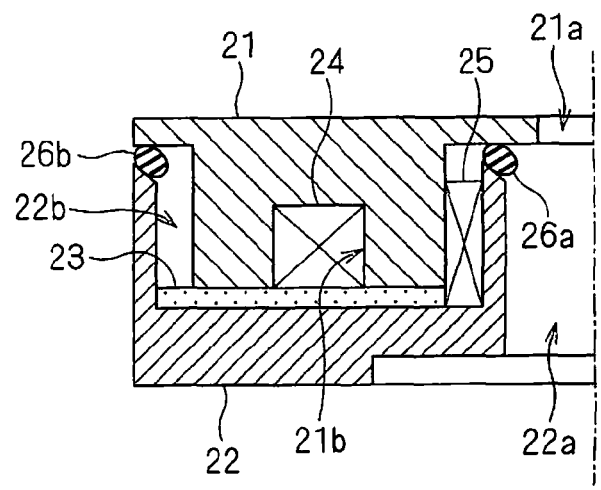

A damper (hereinafter called "MR damper") 20 using a magnetic fluid is disposed below the steering crown 6 and arranged to generate a steering damping forces. The construction of MR damper 20 will be described with reference to FIGS. 3A through 3C. FIG. 3A is a view in vertical section showing an outline of the MR damper, FIG. 3B is an exploded perspective view, and FIG. 3C is an enlarged fragmentary sectional view.

The MR damper 20 includes an upper yoke 21 and a lower yoke 22 opposed to each other, a magnetic fluid 23 interposed between the upper yoke 21 and lower yoke 22, and a magnetic field generating coil 24 arranged to apply a magnetic field to the magnetic fluid 23. The upper yoke 21 has a through-hole 21a formed centrally thereof for receiving the steering shaft 10, and is shaped annular as a whole. The upper yoke 21 is formed of a magnetic material such as rolled steel. The upper yoke 21 preferably corresponds to the first member of the damper according to a preferred embodiment of the present invention.

An annular groove 21b is formed in the bottom of the upper yoke 21, and the magnetic field generating coil 24 is embedded in the groove 21b. The magnetic field generating coil 24 is supplied with a current corresponding to a steering damping force from a controller to be described below.

Similarly to the upper yoke 21, the lower yoke 22 has a through-hole 22a formed centrally thereof for receiving the steering shaft 10, and is shaped annular as a whole. The lower yoke 22 also is formed of a magnetic material such as rolled steel. An annular groove 22b is formed in the upper surface of the lower yoke 22, and the upper yoke 21 is fitted in this groove 22b. The lower yoke 22 preferably corresponds to the second member of the damper according to a preferred embodiment of the present invention.

A cylindrical collar 25 formed of a metallic material such as aluminum is fitted on an inner wall of the groove 22b of the lower yoke 22. The upper yoke 21 is rotatably held by the lower yoke 22 through the collar 25. The collar 25 may be replaced with a well-known roller bearing. However, with use of the collar 25, the MR damper 20 can be reduced in size.

The magnetic fluid 23 is stored in the groove 22b of the lower yoke 22. The bottom of the groove 22b of the lower yoke 22 and the lower surface of the upper yoke 21 are opposed to each other with the magnetic fluid 23 in between. Preferably, the magnetic fluid 23 contains about 40% of carboxyl iron, for example. When a magnetic field is applied to the magnetic fluid 23, its viscosity will increase to increase the damping force of MR damper 20. The magnetic fluid 23 has a certain fixed viscosity without the magnetic field applied thereto. Thus, the MR damper 20 generates a minimum damping force when no magnetic field is applied.

Further, O-rings 26a and 26b are fitted in inner and outer annular gaps formed between the upper yoke 21 and lower yoke 22. This prevents leakage of the magnetic fluid 23, and keeps dust and the like from entering the MR damper 20.

The lower yoke 22 is connected to the head pipe 13. On the other hand, the upper yoke 21 is connected to the steering crown 6. That is, the lower yoke 22 is connected to the vehicle body side, while the upper yoke 21 is connected to the handlebar side. Consequently, when the handlebars 9 are operated, the magnetic fluid interposed between the upper yoke 21 and lower yoke 22 produces a resistance according to the viscosity, and this resistance serves as the steering damping force acting on the handlebars 9.

(3) Construction of Controller

Reference is made to FIG. 4. FIG. 4 is a block diagram showing an outline of the steering damper system according to the first preferred embodiment.

The steering damper system in the first preferred embodiment includes the MR damper 20 arranged to generate a steering damping force, the vehicle speed sensor 15 arranged to detect vehicle speed, the steering angle sensor 14 arranged to detect the steering angle, and the controller 30 arranged to control the MR damper 20 (specifically, the steering damping force) based on detection signals received from the vehicle speed sensor 15 and the steering angle sensor 14. The vehicle speed sensor 15 preferably corresponds to the vehicle speed detector according to a preferred embodiment of the present invention.

The controller 30 includes an adjusting command output unit 31, a damping force command output unit 32, and a damper driver 33. The adjusting command output unit 31 has a reference table 31A in which areas for determining the amount of adjustment of the damping force are marked off by steering angle ranges according to vehicle speed, wherein the steering angle ranges becoming narrower with an increase in the vehicle speed. Using this reference table 31A, the adjusting command output unit 31 outputs a command to adjust the damping force according to an area covering the vehicle speed detected by the vehicle speed sensor 15 and the steering angle detected by the steering angle sensor 14. The damping force command output unit 32 outputs a damping force command to the damper according to the command to adjust the damping force outputted from the adjusting command output unit 31. The damper driver 33 drives the MR damper 20 to adjust the damping force based on the damping force command outputted from the damping force command output unit 32. The adjusting command output unit 31 preferably corresponds to the adjusting command output unit according to a preferred embodiment of the present invention. The damping force command output unit 32 preferably corresponds to the damping force command output unit according to a preferred embodiment of the present invention. The damper driver 33 preferably corresponds to the damper driver according to a preferred embodiment of the present invention. The reference table 31A preferably corresponds to the storage unit arranged to store the control information according to a preferred embodiment of the present invention.

(3-1) Construction of Damping Force Command Output Unit 32

The damping force command output unit 32 has a steering angle speed calculating circuit 34A, a steering angle direction determining unit 34B, a damping force calculating unit 35, and a damping force adjusting unit 36. The steering angle speed calculating circuit 34A calculates a steering angle speed based on a steering angle detection signal received from the steering angle sensor 14. The steering angle direction determining unit 34B determines a direction of a steering angle based on a steering angle detection signal received from the steering angle sensor 14. The damping force calculating unit 35, when steering action is taken in a direction to increase the steering angle, outputs an initial command for the damping force according to a steering angle speed so that the damping force may become larger with an increase in the steering angle speed, and when steering action is taken in a direction to decrease the steering angle, outputs a command for substantially minimizing the damping force. The damping force adjusting unit 36 adjusts the initial command for the damping force in response to the damping force adjusting command received from the adjusting command output unit 32, and outputs a damping force command for the MR damper 20 to the damper driver 33. The steering angle speed calculating circuit 34 preferably corresponds to the steering angle speed calculating unit according to a preferred embodiment of the present invention. The damping force calculating unit 35 preferably corresponds to the damping force calculating unit according to a preferred embodiment of the present invention. The damping force adjusting unit 36 preferably corresponds to the damping force adjusting unit according to a preferred embodiment of the present invention.

Steering Angle Speed Calculating Circuit 34A

The steering angle speed calculating circuit 34A calculates a steering angle speed by differential processing of the steering angle detection signal from the steering angle sensor 14.

Steering Angle Direction Determining Unit 34B

The steering angle direction determining unit 34B determines a direction of a steering angle according to a positive or negative value resulting from the differential processing of the steering angle detection signal from the steering angle sensor 14. For example, when a detected steering angle is larger than a neutral position having a steering angle of zero (e.g., when the handlebars are turned rightward), and if the value resulting from the differential processing of the steering angle detection signal is "positive", the steering angle direction determining unit 34B determines that steering action is taken in a direction to increase the steering angle (that is, the handlebars are turned further). If the value resulting from the differential processing of the steering angle detection signal is "negative", the steering angle direction determining unit 34B determines that steering action is taken in a direction to decrease the steering angle (that is, the handlebars are returned toward the neutral position). Conversely, when a detected steering angle is smaller than a neutral position having a steering angle of zero (e.g., when the handlebars are turned leftward), and if the value resulting from the differential processing of the steering angle detection signal is "negative", the steering angle direction determining unit 34B determines that steering action is taken in a direction to increase the steering angle (that is, the handlebars are turned further). If the value resulting from the differential processing of the steering angle detection signal is "positive", the steering angle direction determining unit 34B determines that steering action is taken in a direction to decrease the steering angle (that is, the handlebars are returned toward the neutral position).

Damping Force Calculating Unit 35

Figure 5:
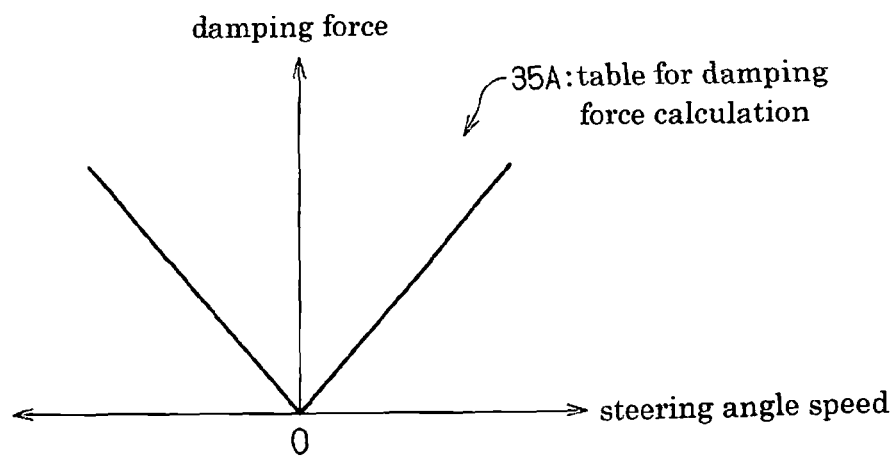
FIG. 5 is a view schematically showing a table for damping force calculations.

The damping force calculating unit 35 has a table 35A arranged to calculate a value of the damping force according to a steering angle speed. Reference is made to FIG. 5. FIG. 5 is a view schematically showing the table 35A for damping force calculation. The table 35A for damping force calculation is a two-dimensional table in which the vertical axis represents damping force and the horizontal axis represents steering angle speed. The steering angle speed and damping force are in such a relationship that the damping force increases with the steering angle speed. The characteristic at the right-hand side of the origin shows damping forces occurring when the handlebars are turned rightward, while the characteristic at the left-hand side shows damping forces occurring when the handlebars are turned leftward. The right and left characteristics are set to be the same. The table 35A preferably includes a ROM (Read Only Memory) which outputs a value of damping force in response to an inputted steering angle speed. The table 35A may include a RAM (Random Access Memory) or flash memory.

When a result of determination is received from the steering angle direction determining unit 34B indicating that steering action is taken in a direction to increase the steering angle, the damping force calculating unit 35 derives from the table 35A for damping force calculation a damping force corresponding to the steering angle speed provided by the steering angle speed calculating circuit 34A, and outputs this damping force as an initial command as the damping force. On the other hand, when a result of determination is received from the steering angle direction determining unit 34B indicating that steering action is taken in a direction to decrease the steering angle, the damping force calculating unit 35 outputs a command for substantially minimizing the damping force irrespective of the steering angle speed at that time.

Damping Force Adjusting Unit 36

The damping force adjusting unit 36 will be described after the construction of the adjusting command output unit 31.

(3-2) Construction of Adjusting Command Output Unit 31

Figure 6:
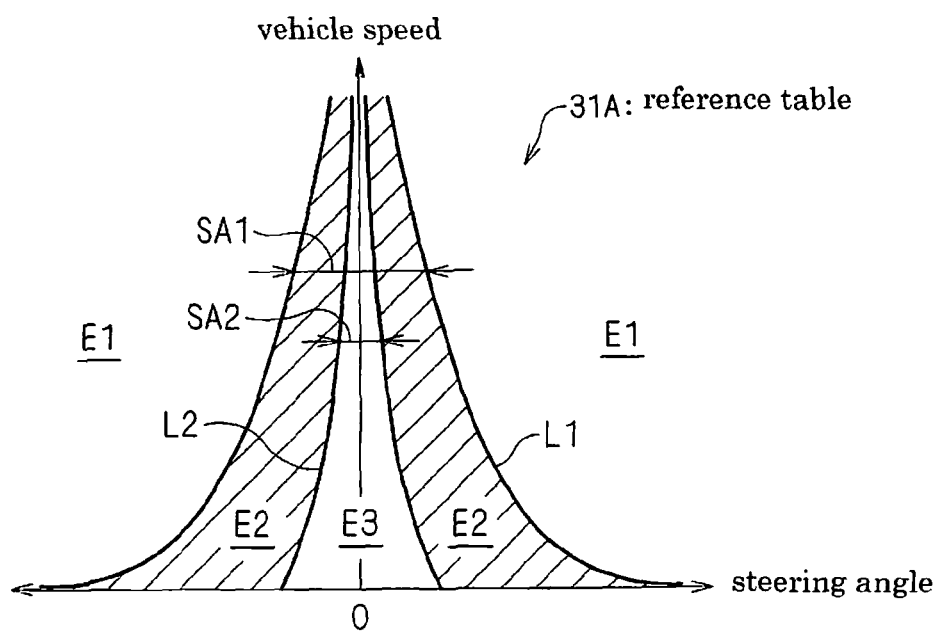
FIG. 6 is a view schematically showing a reference table.

The reference table 31A included in the adjusting command output unit 31 will now be described. Reference is made to FIG. 6. FIG. 6 is a view schematically showing the reference table 31A. This reference table 31A is a two-dimensional table in which the horizontal axis represents steering angle, and the vertical axis represents vehicle speed. As is the table 35A described above, the reference table 31A is preferably a ROM (ReadOnlyMemory) which outputs an adjusted value (control information) in response to an inputted vehicle speed and steering angle. The reference table 31A may include a RAM (Random Access Memory) or flash memory. In the reference table 31A, the area at the right-hand side of the origin shows a case when the handlebars are turned rightward with respect to the traveling direction, while the area at the left-hand side shows a case when the handlebars are turned leftward with respect to the traveling direction. The right and left areas are symmetrical. The reference table 31A has three areas E1, E2, and E3 to determine adjusting an amount of the steering damping force. The areas E1, E2, and E3 are marked off by a first steering angle range SA1 and a second steering angle range SA2 according to the vehicle speed, each of the steering angle ranges SA1 and SA2 becoming more narrow with an increase in vehicle speed.

The area E1 and area E2 are marked off by the first steering angle range SA1. The first steering angle range SA1 corresponds to a steering angle range applicable when the vehicle is in a cornering state. In an ordinary run, the vehicle usually is slowed down when making a sharp turn. The vehicle is driven relatively fast when making a gentle turn. That is, the steering angle range applicable when the vehicle is in a cornering state is wide for low speed, and becomes narrower for a higher speed. The first steering angle range is determined based on empirical rules of steering in such cornering states, and is preferably set to become narrower as the vehicle speed becomes faster.

The area E2 and area E3 are marked off by the second steering angle range SA2. The second steering angle range SA2 corresponds to a steering angle range applicable when the vehicle is in a straight running state. In a straight running state, the rider maintains the balance of the vehicle by means of small steering angles. The steering angle range for balancing the vehicle also is relatively wide for low speed, and becomes narrower for a higher speed. The second steering angle range SA2 is determined based on empirical rules of steering in the straight running state, and is set to become narrower as the vehicle speed becomes faster. Naturally, the steering angle range applicable when the vehicle is in a straight running state is narrower than the steering angle range applicable when the vehicle is in a cornering state. Thus, the second steering angle range SA2 for straight running is set to an area inward of the first steering angle range SA1 for cornering.

As can be understood from the above, the area E3 inside the second steering angle range SA2 corresponds to a straight running state. That is, when coordinates on the reference table 31A determined by a vehicle speed and a steering angle detected belong to the area E3, the vehicle can be said to be in a straight running state. In a straight running state, the rider maintains the balance of the vehicle via small steering angles as noted above. Thus, in order not to obstruct natural handlebar control, it is desirable to make the steering damping force small. So, control information for making the damping force small is allotted to the area E3 on the reference table 31A. The control information for making the damping force small may, for example, be an adjustment factor which multiplies and varies the damping force calculated by the damping force calculating unit 35. A small adjustment factor corresponds to the control information for making the damping force small. The damping force (a relatively small damping force) acquired from the control information belonging to the area E3 inside the second steering angle range SA2 preferably corresponds to the third damping force according to a preferred embodiment of the present invention.

The area E2 outside the second steering angle range SA2 and inside the first steering angle range SA1 corresponds to a cornering state. That is, when coordinates on the reference table 31A determined by a vehicle speed and a steering angle detected belong to the area E2, the vehicle can be said to be in a cornering state. In a cornering state, it is desirable to increase the damping force to reduce the burden of the rider for stabilizing steering action. So, control information for increasing the damping force is allotted to the area E2 on the reference table 31A. Following the foregoing example, a large adjustment factor corresponds to the control information for increasing the damping force. The damping force (a relatively large damping force) acquired from the control information belonging to the area E2 outside the second steering angle range SA2 and inside the first steering angle range SA1 preferably corresponds to the first damping force according to a preferred embodiment of the present invention.

Further, the area E1 outside the first steering angle range SA1 corresponds to a special running state in which the rider intentionally turns the handlebars to large degrees such as in jumping, counter steering to cause the rear wheel to skid, and a wheelie run. That is, when coordinates on the reference table 31A determined by a vehicle speed and a steering angle detected belong to the area E1, the vehicle can be said to be in a special running state. In a special running state, it is desirable to make the steering damping force small for allowing the rider to carry out steering operations. So, control information for making the damping force small is allotted to the area E1 on the reference table 31A. For example, a small adjustment factor is allotted to the area E1. The damping force (relatively small damping force) acquired from the control information belonging to the area E1 outside the first steering angle range SA1 preferably corresponds to the second damping force according to a preferred embodiment of the present invention.

It has been described that, with the reference table 31A shown in FIG. 6, an adjustment factor determined beforehand is allotted uniformly to each of the area E1 corresponding to a special running state, area E2 corresponding to a cornering state, and area E3 corresponding to a straight running state. In that case, however, when a transition is made from a straight running state to a cornering state, for example, coordinates on the reference table 31A determined by a detected vehicle speed and a steering angle will shift from the area E3 to the area E2, with a result that the adjustment factor changes sharply on the boundary line. That is, at a time of transition from a straight running state to a cornering state, there occurs a phenomenon in which the steering damping force increases quickly at a certain steering angle. This is undesirable in that it gives the rider an odd feeling. Thus, it is preferred to set an adjustment factor to each of the areas E1, E2, and E3 so that adjustment factors may change smoothly on the boundary lines of the areas E1, E2, and E3.

Figure 7:
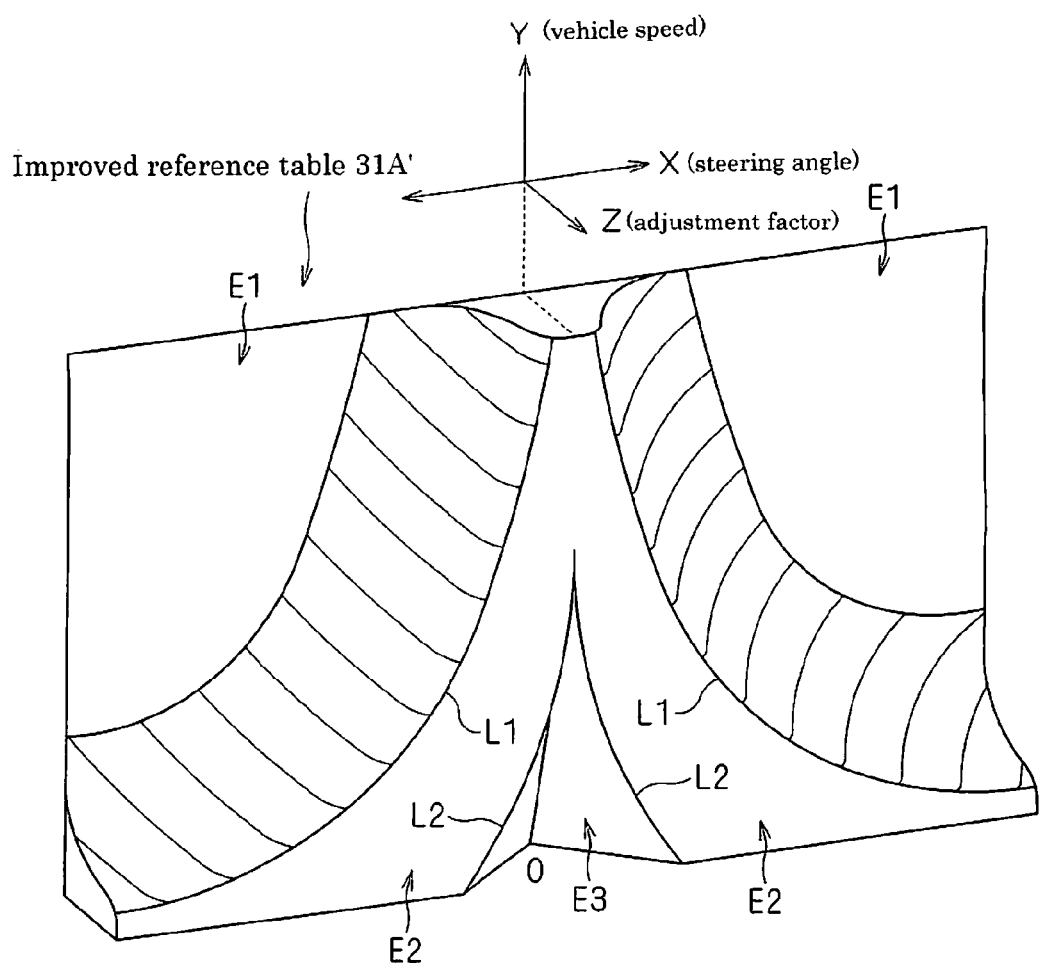
FIG. 7 is a view schematically showing an improved reference table.

FIG. 7 is a schematic view of an improved reference table 31A'. In the reference table 31A' shown in FIG. 7, X-direction represents steering angle, Y-direction represents vehicle speed, and Z-direction represents the size of the adjustment factor. The amount of the adjustment (i.e., adjustment factors in the above example) are set to vary gradually with distances from the boundary lines L1 and L2 dividing the areas E1, E2, and E3. Specifically, in the area E3 inward of the boundary line L2, the adjustment factor gradually becomes small with an increase in the distance from the boundary line L2. In the area E2 between the boundary line L2 and boundary line L1, a substantially constant, relatively large adjustment factor is set. In the area E1 outward of the boundary line L1, the adjustment factor gradually becomes small with an increase in the distance from the boundary line L2, and a substantially constant, relatively small adjustment factor is set in distant regions to some extent. With such a reference table 31A', it is possible to avoid the adjustment factor changing sharply adjacent the boundary lines L1 and L2 dividing the areas E1, E2, and E3. Thus, the steering damping force can be changed smoothly.

Damping Force Adjusting Unit 36

In response to a damping force adjusting command outputted from the adjusting command output unit 31, the damping force adjusting unit 36 adjusts the initial command of the damping force received from the damping force calculating unit 35, and outputs a damping force command for the MR damper 20. Specifically, the damping force adjusting unit 36 adjusts the damping force by multiplying the damping force calculated by the damping force calculating unit 35 by the adjustment factor of the damping force received from the adjusting command output unit 31.

(3-3) Construction of Damper Driver 33

The damper driver 33 includes a damper current adjusting unit 37 and a current driving circuit 38. The damper current adjusting unit 37 receives the damping force command as one input from the damping force adjusting unit 36. The damper current adjusting unit 37 receives, as the other input, a current value of the current driving circuit 38 detected by a current detecting sensor 39. The current value of the current driving circuit 38 corresponds to the level of the damping force generated by the MR damper 20. The damper current adjusting unit 37 compares the damping force command which is the one input and the current value of the current driving circuit 38 which is the other input, and outputs a PWM (pulse width modulation) signal adjusted to cancel a difference therebetween. The PWM signal outputted from the damper current adjusting unit 37 is provided to the current driving circuit 38. The current driving circuit 38 applies a current of a size corresponding to the duty ratio of the PWM signal to the magnetic field generating coil 24 of MR damper 20. The magnetic field generating coil 24 generates a magnetic field according to the current value supplied. As a result, the viscosity of the magnetic fluid 23 of MR damper 20 changes to generate a damping force corresponding to the damping force command in MR damper 20.

(4) Operation of the Steering Damper System

Figure 8:
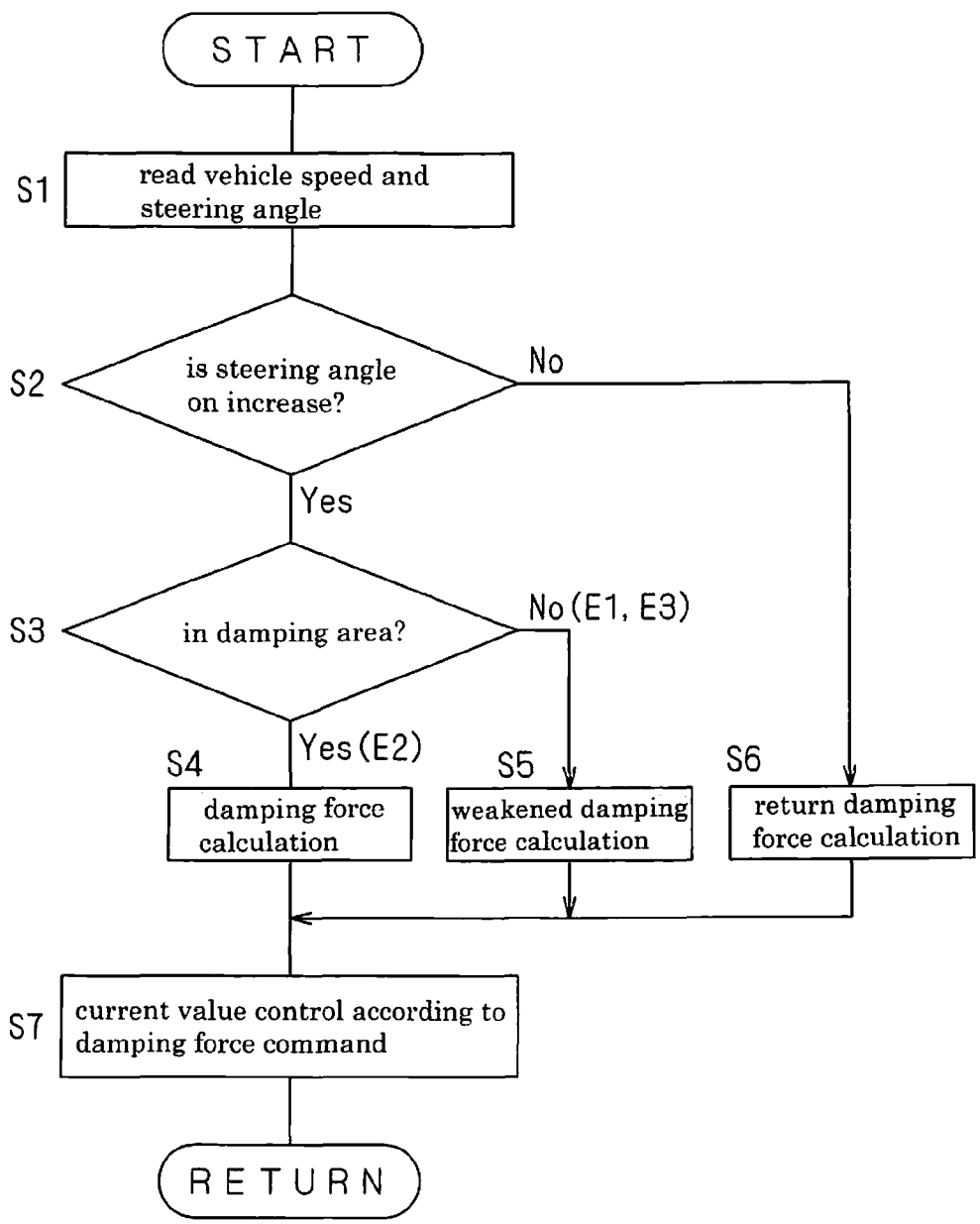
FIG. 8 is a flow chart showing an operating sequence of the steering damper system.

Next, operation of the steering damper system having the above construction will be described. Reference is made to FIG. 8. FIG. 8 is a flowchart showing the sequence of operations of the steering damper system.

Step S1

The controller 30 reads vehicle speed detection signals from the speed sensor 15 and steering angle detection signals from the steering angle sensor 14 at regular time intervals. The vehicle speed detection signals are provided to the adjusting command output unit 31. The steering angle detection signals are provided to the adjusting command output unit 31, steering angle speed calculating circuit 34A, and steering angle direction determining unit 34B, respectively.

Step S2

The steering angle direction determining unit 34B of the controller 30 carries out differentiation processing of the read steering angle detection signals, and determines from the positive/negative sign whether steering action is taken in a direction to increase the steering angle or in a direction to decrease the steering angle. When it is determined that steering action is taken in the direction to increase the steering angle (that is, the handlebars are turned further), the operation proceeds to step S3. When it is determined that steering action is taken in the direction to decrease the steering angle (that is, the handlebars are turned toward the neutral position), the operation proceeds to step S6.

Step S3

In step S3, the adjusting command output unit 31 determines whether the coordinates on the reference table 31A determined by the detected vehicle speed and steering angle are within a damping area (e.g., area E2 to which a relatively large adjustment factor is allotted) Specifically, it is determined which of the areas E1, E2, and E3 the coordinates belong to. When the coordinates belong to the area E2 corresponding to a cornering state, the operation proceeds to step S4. When the coordinates belong to the area E1 corresponding to a straight running state, or the area E3 corresponding to a special running state, the operation proceeds to step S5.

Step S4

In Step S4, the damping force for the area E2 is calculated. Specifically, the damping force calculating unit 35 of the controller 30 refers to the table 35A for damping force calculation, and calculates an initial value of the damping force for the MR damper 20 according to a steering angle speed calculated by the steering angle speed calculating circuit 34A. When the handlebars 9 are operated quickly, a relatively large initial value of the damping force is calculated. When the handlebars 9 are operated slowly, a relatively small initial value of the damping force is calculated. The initial value (initial command) of the damping force calculated is provided to the damping force adjusting unit 36. The damping force adjusting unit 36 adjusts the damping force by multiplying the damping force calculated by the damping force calculating unit 35 by the adjustment factor corresponding to the area E2 received from the adjusting command output unit 31. Since the adjustment factor corresponding to the area E2 has a relatively large value, a relatively large initial value of the damping force is outputted as a damping force command.

Step S5

In step S5, a calculation is performed to make the damping force small (weak damping force calculation) according to the area E1 or area E3. Specifically, as in step S4, the damping force calculating unit 35 calculates an initial value of the damping force according to a steering angle speed. The damping force adjusting unit 36 adjusts the damping force in a direction to make it small by multiplying the initial value of the damping force calculated by the damping force calculating unit 35 by the relatively small adjustment factor corresponding to the area E2 or area E3 received from the adjusting command output unit 31.

Step S6

When it is determined in step S2 that steering action is taken in the direction to decrease the steering angle, step S6 is executed to calculate a value of the damping force for returning the handlebars to the neutral position. Specifically, the damping force calculating unit 35 outputs a command for substantially minimizing the damping force irrespective of steering angle speed. The damping force adjusting unit 36 having received this command outputs a damping force command for substantially minimizing the damping force.

As described above, when the vehicle is cornering while steering action is taken in the direction to increase the steering angle (that is, the handlebars are turned further), the damper driver 33 is provided a damping force command to generate a relatively large damping force. When the vehicle is running straight or is in a special running state, the damper driver 33 is provided a damping force command for generating a small damping force. When steering action is taken in the direction to decrease the steering angle (that is, the handlebars are turned toward the neutral position), the damper driver 33 is provided a damping force command for substantially minimizing the damping force.

Step S7

The damper current adjusting unit 37 of the damper driver 33 adjusts the PWM signal to agree with a provided damping force command. As a result, the current value supplied to the magnetic field generating coil 24 of MR damper 20 is adjusted to generate a damping force in the MR damper 20 according to the damping force command.

The steering damper system in the first preferred embodiment described above produces the following effects. The damping force of MR damper 20 becomes small when the vehicle is in a straight running state, which enables the rider to carry out steering operations lightly for maintaining the balance of the vehicle by means of small steering angles. A relatively large damping force is applied when the vehicle is in a cornering state, which reduces the rider's burden accompanying the steering operation at the time of cornering. The damping force becomes small in a special running state such as jumping, counter steering to cause the rear wheel to skid, or a wheelie run. This allows the rider to carry out steering operations freely.

The first steering angle range SA1 which divides the area E1 and area E2 of the reference table 31A, and the second steering angle range SA2 which divides the area E2 and area E3, are both set to become narrower with an increase in vehicle speed. That is, the reference table 31A reflects the empirical rules of steering that the applicable steering angle range becomes narrower with an increase in vehicle speed even in the same straight running state or cornering state. Thus, running states of the vehicle can be determined properly. The damping force according to a running state can be adjusted appropriately to reduce the rider's burden accompanying steering operations and improve controllability.

Second Preferred Embodiment

Next, the second preferred embodiment of the present invention (i.e., the first and second aspects of the second preferred embodiment of the present invention) will be described with reference to the drawings.

Figure 9:
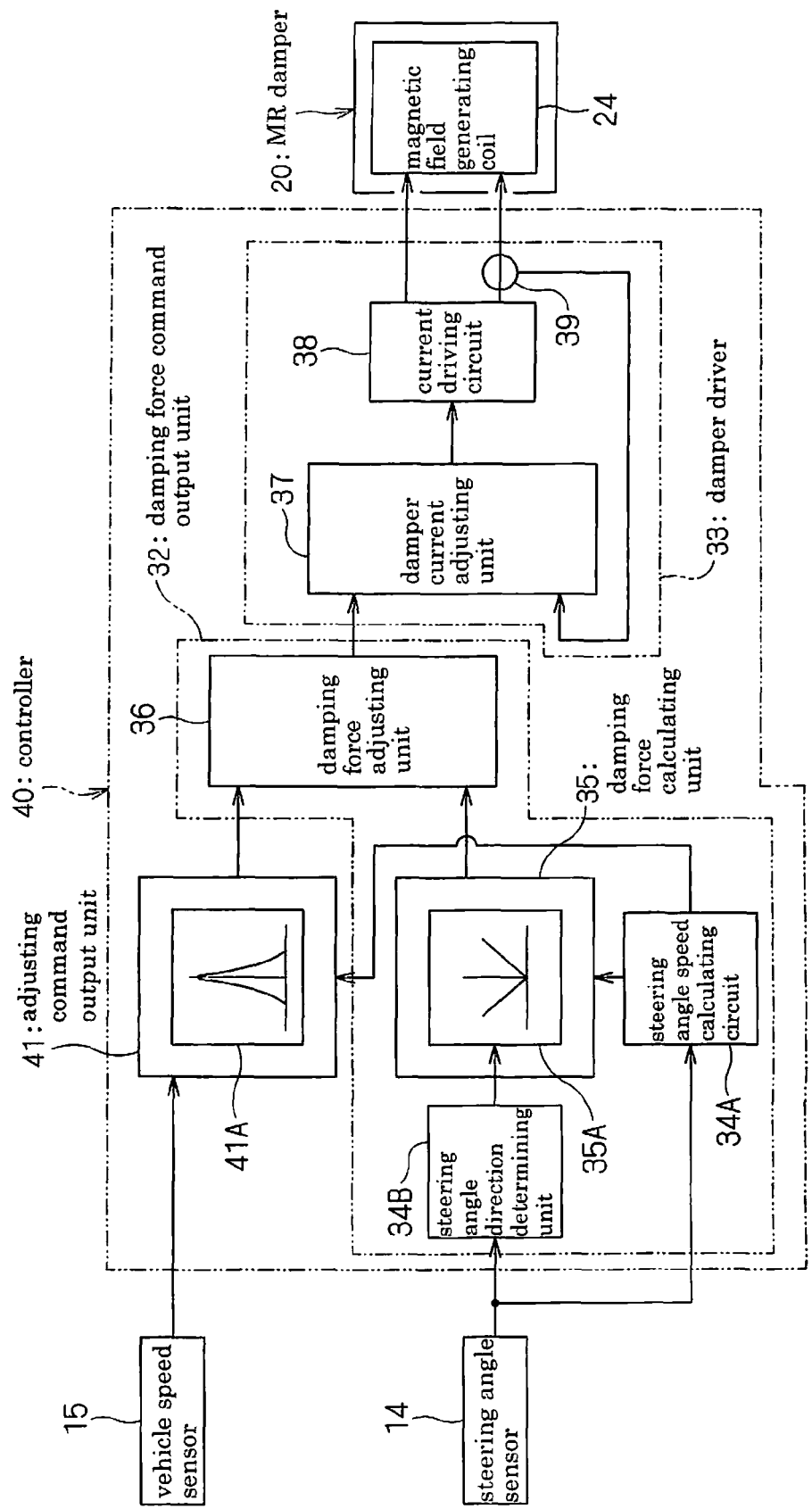
FIG. 9 is a block diagram showing an outline of a steering damper system according to a second preferred embodiment of the present invention.

FIG. 9 is a block diagram showing an outline of a steering damper system according to the second preferred embodiment. In FIG. 9, like reference signs are used to identify like features in FIG. 4 which are the same as in the steering damper system in the first preferred embodiment and will not be described again.

Construction of Adjusting Command Output Unit 41

A controller 40 of the steering damper system in the second preferred embodiment includes an adjusting command output unit 41 different from the adjusting command output unit 31 in the first preferred embodiment. The adjusting command output unit 41 has a reference table 41A in which areas for determining the amount of the adjustment of the damping force are marked off by a steering angle range according to vehicle speeds, wherein the steering angle range becomes narrower with an increase in vehicle speed. Using this reference table 41A, the adjusting command output unit 41 outputs a command for adjusting the damping force according to an area including a detected vehicle speed and a calculated steering angle speed. The adjusting command output unit 41 preferably corresponds to the adjusting command output unit according to the second preferred embodiment of the present invention. The reference table 41A preferably corresponds to the storage unit arranged to store the control information in the second preferred embodiment of the present invention.

Figure 10:
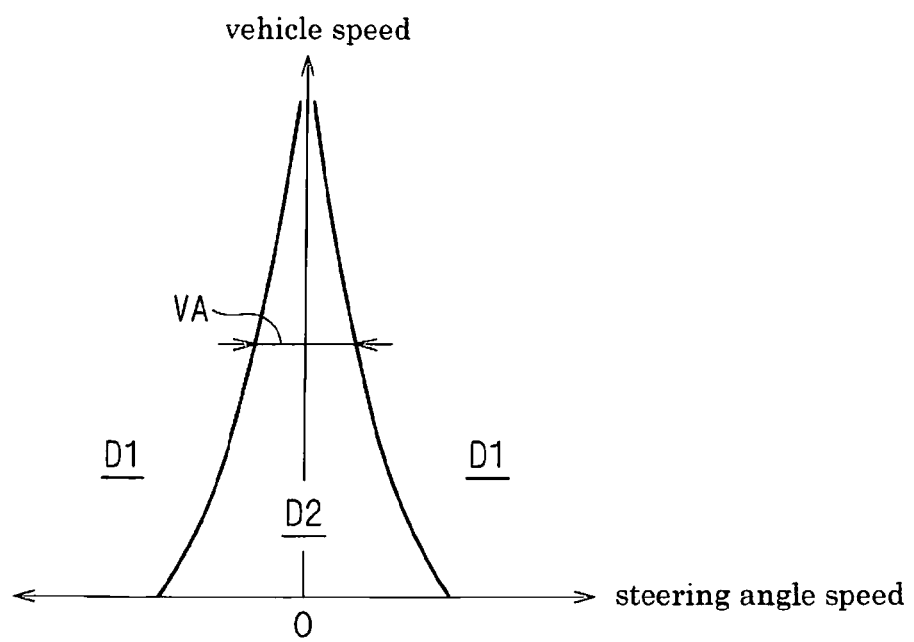
FIG. 10 is a view schematically showing a reference table used in the second preferred embodiment of the present invention.

The reference table 41A included in the adjusting command output unit 41 will now be described. Reference is made to FIG. 10. FIG. 10 is a view schematically showing the reference table 41A. This reference table 41A is a two-dimensional table in which the horizontal axis represents steering angle speed, and the vertical axis represents vehicle speed. The reference table 41A has two areas D1 and D2 for determining the adjusting amount of the steering damping force. The areas D1 and D2 are marked off by a steering angle speed range VA according to vehicle speed, wherein the steering angle speed range VA narrows with an increase in vehicle speed.

The steering angle speed range VA corresponds to a steering angle speed range applicable when the vehicle is in a straight running state. In a straight running state, the rider maintains the balance of the vehicle by means of relatively slow steering angle speeds. This steering angle speed range also is relatively wide for low speed, and becomes narrower for a higher speed. The steering angle speed range VA is determined based on empirical rules of steering in the straight running state.

The area D2 inside the steering angle speed range VA corresponds to a straight running state with a relatively slow steering angle speed. In a straight running state, as noted in the first preferred embodiment, it is desirable to make the steering damping force small in order not to obstruct natural handlebar control. So, a relatively small adjustment factor is allotted to the area D2 for making the damping force small. On the other hand, the area D1 outside the steering angle speed range VA corresponds to a cornering state with a relatively fast steering angle speed. In a cornering state, it is desirable to increase the damping force to reduce the burden of the rider for stabilizing steering action. So, a relatively large adjustment factor is allotted to the area D1 for increasing the damping force.

According to the steering damper system in the second preferred embodiment, the adjusting command output unit 41 receives a steering angle speed calculated by the steering angle speed calculating circuit 34A and a vehicle speed detected by the vehicle speed sensor 15. The adjusting command output unit 41 refers to the reference table 41A, determines which of the areas D1 and D2 includes coordinates on the reference table 41A determined by the vehicle speed and steering angle speed, and outputs a damping force adjusting command according to the area to which the coordinates belong. The areas marked off on the reference table 41A become narrower with an increase in the vehicle speed. The reference table 41A having such areas accurately reflects the running states of the vehicle. Therefore, by referring to the reference table 41A, running states of the vehicle can be determined accurately from the detected vehicle speed and steering angle speed. The damping force according to running states of the vehicle can be adjusted properly. The damping force adjusting command outputted from the adjusting command output unit 41 is provided to the damping force command output unit 32. The damping force command output unit 32 outputs a damping force command to the damper according to the damping force adjusting command. The damper driver 33 drives the MR damper 20 and adjusts the damping force based on the damping force command. Consequently, the steering damping force becomes suitable for running states of the vehicle. The steering damper system reduces the rider's burden accompanying steering operations, and achieves excellent controllability.

The present invention is not limited to the foregoing preferred embodiments, but may be modified as follows.

Each of the foregoing preferred embodiments has been described with respect to a motorcycle as an example of a saddle riding type vehicle. The present invention is not limited to this, but is applicable also to other saddle riding type vehicles such as a three-wheeled automotive vehicle having two wheels at the front or rear, a buggy and so on.

In the first preferred embodiment described hereinbefore, the control information for adjusting the damping force is exemplified by a table (reference table 31A) having three areas E1, E2, and E3 divided by the first steering angle range corresponding to the steering angle range applicable to a cornering state, and the second steering angle range corresponding to the steering angle range applicable to a straight running state. However, the control information may include a table having two areas divided only by the first steering angle range corresponding to the steering angle range applicable to a cornering state. In this case, the adjusting command output unit 31 may output an adjusting command for increasing the damping force (i.e., generate the first damping force) when the detected vehicle speed and steering angle belong to the area inside the first steering angle range, and output an adjusting command for making the damping force small (i.e., generate the second damping force smaller than the first damping force) when the detected vehicle speed and steering angle belong to the area outside the first steering angle range. Of course, in this example also, the first steering angle range preferably becomes narrower with an increase in vehicle speed.

Further, the reference table may be a table having two areas divided only by the second steering angle range corresponding to the steering angle range applicable to a straight running state of the vehicle. In this case, the adjusting command output unit 31 may output an adjusting command for increasing the damping force (i.e., generate the first damping force) when the detected vehicle speed and steering angle belong to the area outside the second steering angle range, and output an adjusting command for making the damping force small (i.e., generate the second damping force smaller than the first damping force) when the vehicle speed and steering angle detected belong to the area inside the second steering angle range. In this example also, the second steering angle range becomes narrower with an increase in vehicle speed.

In the foregoing preferred embodiments, the damping force calculating unit 35 is arranged to refer to the table 35A for damping force calculation to calculate an initial value of the damping force according to a steering angle speed. However, the damping force calculating unit may further adjust the initial value of the damping force calculated according to a steering angle speed to become larger with an increase in vehicle speed. With this arrangement, a value of the damping force is calculated by considering not only a steering angle speed but also a vehicle speed into consideration. Thus, the damping force becomes larger with an increase in vehicle speed thereby further reducing the rider's burden accompanying steering operations at a time of a high-speed run.

In the foregoing preferred embodiments, the steering damping force is substantially minimized when the handlebars are being returned to the neutral position. Instead, a small damping force may be applied when the handlebars are returned to the neutral position. Further, the damping force may be adjusted to become larger with an increase in vehicle speed.

The foregoing preferred embodiments illustrate the steering damper system using the MR damper. The present invention is also applicable to a hydraulic steering damper system. That is, the same construction as in the preferred embodiments described above may be achieved by controlling an orifice diameter using the control information described above.

The present invention may be embodied in other specific forms without departing from the spirit or essential attributes thereof and, accordingly, reference should be made to the appended claims, rather than to the foregoing specification, as indicating the scope of the invention.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A steering damper system comprising:
   a damper arranged to generate a steering damping force;
   a storage unit arranged to store control information in which areas for determining an amount of adjustment of the damping force are divided by a steering angle range according to vehicle speed;
   an adjusting command output unit arranged to output a damping force adjusting command based on the control information stored in the storage unit according to one of the areas to which a vehicle speed and a steering angle belong;
   a damping force command output unit arranged to output a damping force command to the damper according to the damping force adjusting command; and
   a damper driver arranged to drive the damper and to adjust the damping force based on the damping force command; wherein
   the control information stored in the storage unit includes a first steering angle range corresponding to a steering angle range applicable when the vehicle is in a cornering state;
   the adjusting command output unit is arranged to output an adjusting command to generate a first damping force when the vehicle speed and the steering angle belong to an area inside the first steering angle range, and to output an adjusting command to generate a second damping force smaller than the first damping force when the vehicle speed and the steering angle belong to an area outside the first steering angle ranged; and
   the first steering angle range becomes narrower with an increase in the vehicle speed.

2. The steering damper system according to claim 1, wherein the adjusting command output unit is arranged to gradually vary the amount of adjustment of the damping force stored in the storage unit according to a distance from a boundary line dividing the areas.

3. The steering damper system according to claim 1, wherein the damping force command output unit includes:

a steering angle speed calculating unit arranged to calculate a steering angle speed;

a damping force calculating unit arranged to output an initial command of the damping force according to the steering angle speed such that the damping force becomes larger with an increase in the steering angle speed; and a damping force adjusting unit arranged to adjust the initial command of the damping force in response to the damping force adjusting command from the adjusting command output unit and to output the damping force command to the damper.

4. The steering damper system according to claim 3, wherein the damping force calculating unit is arranged, when a steering action is taken in a direction to increase the steering angle, to output the initial command of the damping force according to the steering angle speed such that the damping force becomes larger with an increase in the steering angle speed, and when a steering action is taken in a direction to decrease the steering angle, to output a command to substantially minimize the damping force.

5. The steering damper system according to claim 3, wherein the damping force calculating unit is arranged to adjust the damping force according to the steering angle speed such that the damping force becomes larger with an increase in the vehicle speed.

6. The steering damper system according to claim 1, wherein:

the damper includes a first member and a second member opposed to each other, a magnetic fluid interposed between the first and second members, and a magnetic field generating coil arranged to apply a magnetic field to the magnetic fluid, one of the first member and the second member arranged to be connected to a vehicle body, and the other of the first member and the second member arranged to be connected to a handlebar; and the damper driver includes a current control unit arranged to adjust a current value applied to the magnetic field generating coil of the damper based on the damping force command.

7. A steering damper system comprising:

a damper arranged to generate a steering damping force;

a storage unit arranged to store control information in which areas for determining an amount of adjustment of the damping force are divided by a steering angle range according to vehicle speed;

an adjusting command output unit arranged to output a damping force adjusting command based on the control information stored in the storage unit according to one of the areas to which a vehicle speed and a steering angle belong;

a damping force command output unit arranged to output a damping force command to the damper according to the damping force adjusting command; and a damper driver arranged to drive the damper and to adjust the damping force based on the damping force command; wherein the control information stored in the storage unit includes a first steering angle range corresponding to a steering angle range applicable when the vehicle is in a straight running state;

the adjusting command output unit is arranged to output an adjusting command to generate a first damping force when the vehicle speed and the steering angle belong to an area outside the first steering angle range, and to output an adjusting command to generate a second damping force smaller than the first damping force when the vehicle speed and the steering angle belong to an area inside the first steering angle range; and the first steering angle range becomes narrower with an increase in the vehicle speed.

8. The steering damper system according to claim 7, wherein the adjusting command output unit is arranged to gradually vary the amount of adjustment of the damping force stored in the storage unit according to a distance from a boundary line dividing the areas.

9. The steering damper system according to claim 7, wherein the damping force command output unit includes:

a steering angle speed calculating unit arranged to calculate a steering angle speed;

a damping force calculating unit arranged to output an initial command of the damping force according to the steering angle speed such that the damping force becomes larger with an increase in the steering angle speed; and a damping force adjusting unit arranged to adjust the initial command of the damping force in response to the damping force adjusting command from the adjusting command output unit and to output the damping force command to the damper.

10. The steering damper system according to claim 9, wherein the damping force calculating unit is arranged, when a steering action is taken in a direction to increase the steering angle, to output the initial command of the damping force according to the steering angle speed such that the damping force becomes larger with an increase in the steering angle speed, and when a steering action is taken in a direction to decrease the steering angle, to output a command to substantially minimize the damping force.

11. The steering damper system according to claim 9, wherein the damping force calculating unit is arranged to adjust the damping force according to the steering angle speed such that the damping force becomes larger with an increase in the vehicle speed.

12. The steering damper system according to claim 7, wherein:

the damper includes a first member and a second member opposed to each other, a magnetic fluid interposed between the first and second members, and a magnetic field generating coil arranged to apply a magnetic field to the magnetic fluid, one of the first member and the second member arranged to be connected to a vehicle body, and the other of the first member and the second member arranged to be connected to a handlebar; and the damper driver includes a current control unit arranged to adjust a current value applied to the magnetic field generating coil of the damper based on the damping force command.

13. A steering damper system comprising:

a damper arranged to generate a steering damping force;

a storage unit arranged to store control information in which areas for determining an amount of adjustment of the damping force are divided by a steering angle range according to vehicle speed;

an adjusting command output unit arranged to output a damping force adjusting command based on the control information stored in the storage unit according to one of the areas to which a vehicle speed and a steering angle belong;

a damping force command output unit arranged to output a damping force command to the damper according to the damping force adjusting command; and a damper driver arranged to drive the damper and to adjust the damping force based on the damping force command; wherein the control information stored in the storage unit includes a first steering angle range corresponding to a steering angle range applicable when the vehicle is in a cornering state, and a second steering angle range inward of the first steering angle range and corresponding to a steering angle range applicable when the vehicle is in a straight running state;

the adjusting command output unit is arranged to output an adjusting command to generate a first damping force when the vehicle speed and the steering angle belong to an area outside the second steering angle range and inside the first steering angle range, to output an adjusting command to generate a second damping force smaller than the first damping force when the vehicle speed and the steering angle belong to an area outside the first steering angle range, and to output an adjusting command to generate a third damping force smaller than the first damping force when the vehicle speed and the steering angle belong to an area inside the second steering angle range; and the first steering angle range and the second steering angle range become narrower with an increase in the vehicle speed.

14. The steering damper system according to claim 13, wherein the adjusting command output unit is arranged to gradually vary the amount of adjustment of the damping force stored in the storage unit according to a distance from a boundary line dividing the areas.

15. The steering damper system according to claim 13, wherein the damping force command output unit includes:
a steering angle speed calculating unit arranged to calculate a steering angle speed;
a damping force calculating unit arranged to output an initial command of the damping force according to the steering angle speed such that the damping force becomes larger with an increase in the steering angle speed; and
a damping force adjusting unit arranged to adjust the initial command of the damping force in response to the damping force adjusting command from the adjusting command output unit and to output the damping force command to the damper.

16. The steering damper system according to claim 15, wherein the damping force calculating unit is arranged, when a steering action is taken in a direction to increase the steering angle, to output the initial command of the damping force according to the steering angle speed such that the damping force becomes larger with an increase in the steering angle speed, and when a steering action is taken in a direction to decrease the steering angle, to output a command to substantially minimize the damping force.

17. The steering damper system according to claim 15, wherein the damping force calculating unit is arranged to adjust the damping force according to the steering angle speed such that the damping force becomes larger with an increase in the vehicle speed.

18. The steering damper system according to claim 13, wherein:
the damper includes a first member and a second member opposed to each other, a magnetic fluid interposed between the first and second members, and a magnetic field generating coil arranged to apply a magnetic field to the magnetic fluid, one of the first member and the second member arranged to be connected to a vehicle body, and the other of the first member and the second member arranged to be connected to a handlebar; and
the damper driver includes a current control unit arranged to adjust a current value applied to the magnetic field generating coil of the damper based on the damping force command.

* * * * *